United States Patent
Guo et al.

(10) Patent No.: US 10,619,055 B2
(45) Date of Patent: Apr. 14, 2020

(54) HYDROXYL GRAPHENE-MODIFIED PLATING SEALANTS AND PREPARATION METHODS THEREOF

(71) Applicant: GUANGZHOU ULTRA UNION CHEMICALS LTD., Guangdong (CN)

(72) Inventors: Chongwu Guo, Guangzhou (CN); Lai Fon Voon, Guangzhou (CN); Xiaohua Li, Guangdong (CN)

(73) Assignee: GUANGZHOU ULTRA UNION CHEMICALS LTD., Guangdong (CN)

( * ) Notice: Subject to any disclaimer, the term of this patent is extended or adjusted under 35 U.S.C. 154(b) by 0 days.

(21) Appl. No.: 16/387,180

(22) Filed: Apr. 17, 2019

(65) Prior Publication Data

US 2019/0241751 A1    Aug. 8, 2019

Related U.S. Application Data

(63) Continuation-in-part of application No. PCT/CN2017/118728, filed on Dec. 26, 2017.

(30) Foreign Application Priority Data

Dec. 22, 2017 (CN) .......................... 2017 1 1406847

(51) Int. Cl.
| | |
|---|---|
| C09D 5/08 | (2006.01) |
| C09D 1/00 | (2006.01) |
| C09D 7/65 | (2018.01) |
| C09D 7/47 | (2018.01) |
| C25D 5/48 | (2006.01) |
| C09D 7/40 | (2018.01) |
| C09D 7/62 | (2018.01) |
| C08K 3/04 | (2006.01) |

(52) U.S. Cl.
CPC .............. *C09D 5/084* (2013.01); *C09D 1/00* (2013.01); *C09D 7/47* (2018.01); *C09D 7/62* (2018.01); *C09D 7/65* (2018.01); *C09D 7/70* (2018.01); *C25D 5/48* (2013.01); *C08K 3/042* (2017.05)

(58) Field of Classification Search
None
See application file for complete search history.

(56) References Cited

U.S. PATENT DOCUMENTS

| | | | |
|---|---|---|---|
| 2012/0277360 A1* | 11/2012 | Scheffer | C08K 3/04 524/237 |
| 2016/0236939 A1* | 8/2016 | De Miguel Turullois | B82Y 30/00 |
| 2016/0276056 A1* | 9/2016 | Stolyarov | H01B 1/04 |
| 2017/0037257 A1* | 2/2017 | Yang | C09D 5/084 |
| 2017/0296976 A1* | 10/2017 | Liu | B01D 67/0006 |

FOREIGN PATENT DOCUMENTS

| | | |
|---|---|---|
| CN | 103740153 A | 4/2014 |
| CN | 106085218 A | 11/2016 |
| CN | 106318200 A | 1/2017 |
| CN | 106590076 A | 4/2017 |
| CN | 107033702 A | 8/2017 |
| KR | 20140065174 A | 5/2014 |

OTHER PUBLICATIONS

International Application No. PCT/CN2017/118728, International Search Report, dated Sep. 7, 2018.

* cited by examiner

*Primary Examiner* — Joseph D Anthony
(74) *Attorney, Agent, or Firm* — Marshall, Gerstein & Borun LLP

(57) ABSTRACT

A hydroxyl graphene-modified plating sealant and a preparation method thereof are disclosed. The plating sealant comprises a film-forming material, a resist, a defoaming agent, a levelling agent, and deionized water; the resist is a nanoscale hydroxyl graphene aqueous solution comprising hydroxyl graphene having a mass fraction of 3.5% to 4% and a pH of 8.0 to 9.5. Nanoscale hydroxyl graphene is used as a resist in the plating sealant of the disclosure, then the hydroxyl groups on hydroxyl graphene can react with the hydroxyl groups of the film-forming material, i.e. silica sol and the silane polymer, by dehydration condensation, thereby significantly improving the performance of the sealing film. The sealing film has higher corrosion resistance and abrasion resistance compared with that prepared by graphene or reduced graphene oxide sealant.

12 Claims, No Drawings

HYDROXYL GRAPHENE-MODIFIED PLATING SEALANTS AND PREPARATION METHODS THEREOF

RELATED APPLICATIONS

This application is a continuation of International Application No. PCT/CN2017/118728, filed on Dec. 26, 2017, which claims priority to Chinese Application No. CN201711406847.X, filed on Dec. 22, 2017, entitled HYDROXYL GRAPHENE-MODIFIED PLATING SEALANTS AND PREPARATION METHODS THEREOF, both of which are hereby being fully incorporated by reference.

TECHNICAL FILED

The disclosure relates to the field of electroplating, and particularly to a hydroxyl graphene-modified sealing agent for a zinc-nickel alloy and zinc coatings and a preparation method thereof.

BACKGROUND

Graphene is a nanoscale carbon material with special functions such as surface effect, small size effect, quantum size effect and macroscopic quantum effect, and properties such as good corrosion resistance, electrical conductivity and excellent mechanical performance. Graphene has been attracting attention since 2004 when it was found, and such a material has great application prospects in many fields.

Zinc plating and zinc-nickel alloy plating have been widely used as anti-corrosion coatings. In order to improve the corrosion resistance of the coatings, the plating is often required to be subjected to sealing treatment after passivation treatment to meet the technical requirements of high-end products in the manufacturing industry. As China steps from the large manufacturing country into the strength manufacturing country, the existing plating sealants and the properties thereof cannot meet the increasing technical requirement in the manufacturing.

The Chinese invention patent publication No. CN 106318200 A titled "Modified Aqueous Composite Sealing Agents and Preparation Methods thereof" discloses a composite plating sealing agent comprising: 50 to 80 parts of methyl silicone resin, 10 to 30 parts of polytetrafluoroethylene, 50 to 60 parts of silica sol, 3 to 10 parts of graphene, 0.5 to 2 parts of catalyst, 1 to 3 parts of film-forming agent, 1 to 3 parts of lubricant, 3 to 5 parts of accelerator, 5 to 8 parts of metal corrosion inhibitor, 3 to 5 parts of surfactant, 1 to 3 parts of silane coupling agent, 15 to 20 parts of lower carbon alcohol, and 30 to 50 parts of water.

The composite sealing agent was prepared according to the above scheme and then added with water to formulate a sealing solution. It was found in the experiment that all the reduced graphene oxide were sunk into the bottom of the sealing solution after leaving for a period of time, thereby the properties of graphene were lost, and the formulated sealing solution only has an performance of the ordinary sealing solution.

It is well known that the reduced graphene oxide generally contains only a small amount of hydrophilic groups, and the reduced graphene oxide (RGO) prepared by using sodium borohydride as a reducing agent cannot be dissolved in water without an emulsifier. A methyl silicone and a silica sol have a large specific surface area and are capable of adsorbing a large amount of surfactant molecules. Therefore, when the composite sealing agent is formulated, the added hydrophobic surfactant will be mostly adsorbed on a surface of the silica sol and the colloidal methyl silicone particles, and the remaining surfactant will be insufficient to allow the solid reduced graphene oxide particles to form a stable emulsion. Due to the high viscosity of the composite sealing agent, the reduced graphene oxide will not be precipitated from the sealing agent, but after the sealing agent is diluted with water to formulate a sealing solution, the reduced graphene oxide will slowly aggregate and finally is precipitated from the sealing solution. If an excessive amount of surfactant is added to emulsify graphene, the silica sol and the methyl silicone resin particles will be completely surrounded by the surfactant, and cannot be effectively crosslinked together during the film formation process, resulting in reduced performances of the sealing film, such as hardness, abrasion resistance, corrosion resistance and the like.

The above patent application provides no method for using the composite sealing agent. If the composite sealing agent is directly used for coating the plating without being diluted with water, the sealing agent has different meanings from the plating sealant. In the electroplating production line, the plating piece is directly immersed in the composite sealing agent, and flow marks and nodules will occur on the surface of the plating piece after taking out from the sealing bath and drying, creating defective products; in addition, the plating thus formed is thick, which often results in an oversize of the plating piece. Therefore, the composite sealing agent cannot be directly used as a sealant in the electroplating production line.

The method of preparing reduced graphene oxide described in the above patent application comprises: oxidizing the graphene with concentrated sulfuric acid and concentrated nitric acid, and then reducing the graphene oxide with sodium borohydride in an ice bath to obtain a reduced graphene oxide suspension, and formulating the composite sealing agent directly with the reduced graphene oxide suspension. The reduced graphene oxide suspension contains a large amount of nitrate and sulfate radicals. These corrosive substances present in the composite sealing agent will seriously affect the corrosion resistance of the sealed plating, which is one of serious technical shortcomings of the above patent application.

The above patent application does not indicate the content of the graphene in the graphene suspension, what the catalyst, the film-forming agent, the lubricant and the accelerator are, and the specific components of the hydrophobic surfactant and the silane coupling agent. Therefore, the technical solution lacks integrity.

The Chinese invention patent publication No. CN 106085218A titled "Highly Efficient and Environmentally Friendly Composite Sealing Agents" discloses a composite plating sealing agent comprising 50 to 80 parts of methyl silicone resin, 10 to 30 parts of alkyd resin, 50 to 60 parts of alumina sol, 3 to 10 parts of reduced graphene oxide, 0.5 to 2 parts of catalyst, 1 to 3 parts of film-forming agent, 1 to 3 parts of lubricant, 3 to 5 parts of accelerator, 5 to 8 parts of metal corrosion inhibitor, 3 to 5 parts of surfactant, 1 to 3 parts of silane coupling agent, 15 to 20 parts of lower alcohol, and 30 to 50 parts of water. The sealing agent is substantially the same as the composite sealing agent disclosed in the invention patent publication No. CN 106318200 A titled "Modified Aqueous Composite Sealing Agents and Preparation Methods thereof". A large amount of surfactant is adsorbed on a surface of the colloidal methyl silicon resin particles, a problem that the reduced graphene oxide is precipitated in the sealing solution is also present, the corrosive substances, i.e. nitrate and sulfate radicals, are still present in the reduced graphene oxide, and the content of the graphene in the reduced graphene oxide suspension is also not shown. In the above sealing agent, no indication is given for which substances of the catalyst, the film-forming agent, the lubricant and the accelerator are, and for the specific components of the hydrophobic surfactant or the silane coupling agent.

SUMMARY

Based on this, in order to overcome the above shortcomings of the prior art, the present disclosure provides a hydroxyl graphene-modified plating sealant and a preparation method thereof.

In order to achieve the above object, the following technical solutions are adopted in the present disclosure:

A hydroxyl graphene-modified plating sealant prepared with components having the following parts by weight:

| | |
|---|---|
| film-forming material | 40 to 60 parts; |
| resist | 4 to 12 parts; |
| defoaming agent | 0.4 to 0.6 parts; |
| levelling agent | 0.8 to 1.5 parts; |
| deionized water | 30 to 50 parts. |

The resist is a nanoscale hydroxyl graphene aqueous solution comprising hydroxyl graphene having a mass fraction of 3.5% to 4.0%, and having a pH of 8.0 to 9.5.

In some embodiments, the resist is a nanoscale hydroxyl graphene aqueous solution comprising hydroxyl graphene having a mass fraction of 3.8%.

In some embodiments, the film-forming material is a mixture comprising a silica sol and one of organic film-forming materials such as a water-soluble silane polymer, a water-soluble polyurethane, and an acrylic resin, and the silica sol has a mass fraction of 30% to 70% in the film-forming material.

In some embodiments, the silica sol has a mass fraction of 50% to 65% in the film-forming material.

In some embodiments, the silica sol is industrial grade, comprises silicon dioxide having a mass fraction of 40%, and has a nanoscale particle size and a pH of 9.0 to 9.5.

In some embodiments, the organic film-forming material is water-soluble silane polymer.

In some embodiments, the water-soluble silane polymer is the water-soluble silane polymer with a product model PU 113 produced by Daikin Chemical, Taiwan.

In some embodiments, a method of preparing hydroxyl graphene comprises: adding concentrated sulfuric acid and graphite into a reactor, preparing a graphene oxide by three-step oxidation at a low temperature, a medium temperature and a high temperature using potassium permanganate as an oxidant, reducing excess potassium permanganate with hydrogen peroxide, removing residual sulfuric acid and salts in the reaction products by electrodialysis, then adding 20% sodium hydroxide solution to pH of 11 to 12 to convert the sulfated graphene into hydroxyl graphene, and removing excess sodium hydroxide by electrodialysis so that the hydroxyl graphene paste solution has a pH of 8.0 to 9.5.

In some embodiments, the defoaming agent is the TANAFOAM S silicone defoaming agent produced by Tuna, Netherlands and having a mass fraction ranging from 46% to 49%.

In some embodiments, the levelling agent is the LA13-863 silicone levelling agent produced by Stahl, Netherlands and having a mass fraction of 25%.

In some embodiments, the method of preparing the plating sealant comprises mixing the respective materials together according to requirement on components and content of the sealant, and uniformly stirring to obtain the sealant product to be produced.

In some embodiments, a method of using the sealant comprises:

(1) diluting the sealant 2.5 to 3.5 times with deionized water in a sealing bath to obtain a sealing solution;

(2) after passivating a zinc-nickel alloy or zinc plating piece and washing with water, immersing in the sealing solution prepared in step (1) for 10 s to 30 s, and drip-drying after taking out from the sealing bath;

(3) blowing away excess sealing solution on a surface of the plating piece by pressure-air, and then baking the plating piece at 70-90° C. for 30 to 60 min.

Compared with the prior art, the present disclosure has the following beneficial effects:

(1) hydroxyl graphene is used as an resist in the sealant of the present disclosure, and in the drying process of the sealant, the hydroxyl groups on the surface of hydroxyl graphene can react with the hydroxyl groups on the surface of the silicon dioxide colloid in the silica sol by dehydration condensation, and also can react with the hydroxyl groups of the silane polymer molecules by dehydration condensation, resulting in the formation of a sealing film with high strength. Compared with the sealing film prepared with graphene or reduced graphene oxide, the sealing film prepared with the hydroxyl graphene-modified sealant has higher corrosion resistance and abrasive resistance;

(2) hydroxyl graphene used in the present disclosure is a nano material which can be uniformly distributed in the three-dimensional network structure of the sealing film. When other components on the surface of the sealing film are corroded, hydroxyl graphene will uniformly cover the surface of the sealing layer, preventing corrosive substances from further destroying the sealing film;

(3) nanoscale hydroxyl graphene used in the present disclosure has high permeability into the pores of the metal plating and strong pore-sealing ability, and can penetrate into the depth of the pores of the metal plating, and the hydroxyl groups of hydroxyl graphene can form a stable compound with the metal, further increasing the corrosion resistance of the sealing film;

(4) hydroxyl graphene used in the present disclosure is water-soluble, and compared with the reduced graphene oxide, no surfactant is required to emulsify hydroxyl graphene, thereby reducing the adverse effect of the surfactant on the performance of the sealing film;

(5) The alcohol groups in the silane polymer used in the present disclosure may form a stable compound with the metal zinc and nickel to protect the plating. When the sealing film is scratched, the alcohol groups may spontaneously crosslink to form a new sealing film, making the sealing film self-healing;

(6) The mixture of the silica sol and the water-soluble silane polymer used in the present disclosure serves as a film-forming agent, which can increase the flexibility of the sealing film.

DETAILED DESCRIPTION

For better understanding the present disclosure, the present disclosure will be further specifically described by the following examples which should not to be construed as limiting the disclosure, and some non-essential improvements and adjustments made by those skilled in the art and based on the above-mentioned disclosure are also considered to fall within the protection scope of the present disclosure.

Example 1: Hydroxyl Graphene-Modified Plating Sealant

Hydroxyl graphene-modified plating sealant of this example comprises the following components:
film-forming material: 50 parts;
resist: 4 parts;
defoaming agent: 0.5 parts;
levelling agent: 1 parts;
deionized water: 40 parts.

The film-forming material comprises a silica sol and a water-soluble silane polymer, the silica sol having a mass fraction of 60% in the film-forming material and the water-soluble silane polymer having a mass fraction of 40% in the film-forming material.

The silica sol is industrial grade, comprises silicon dioxide having a mass fraction of 40%, and has a nanoscale particle size and a pH of 9.0 to 9.5. The water-soluble silane polymer is the water-soluble silane polymer with a product model PU 113 prepared by Dakin Chemical, Taiwan.

The resist is a hydroxyl graphene paste aqueous solution having a pH of 8.0 to 9.5 and comprising hydroxyl graphene having a mass fraction of 3.8% and a nanoscale particle size.

A method of preparing hydroxyl graphene is as follows:

(1) low temperature oxidation: to a 1000 mL beaker was added 115 mL of concentrated sulfuric acid, the concentrated sulfuric acid was cooled to a temperature of 2 to 5° C. under an ice water bath, 5 g of 300-mesh flake graphite powder having a mass fraction of more than 99% was added, followed by 18 g of potassium permanganate slowly under stirring. The reaction was controlled at a temperature in the range of 2 to 10° C., and the mixture was reacted under stirring for 120 min;

(2) medium temperature oxidation: the ice water bath was replaced with a warm water bath, the reaction was controlled at a temperature between 30 to 40° C., reacting under stirring for 90 min;

(3) high temperature oxidation: the beaker was removed from the water bath after the medium temperature reaction, and the paste in the beaker was heated to 90° C. 100 mL of water was slowly added, the reaction was controlled at a temperature between 90 to 100° C., and the mixture was stirred for 30 min. 15 mL of 30% hydrogen peroxide was slowly added to the beaker, and reaction continued for 30 min;

(4) sulfuric acid and salts in the reaction products were removed by electrodialysis, 20% sodium hydroxide solution was added to a pH of 11 to 12 to convert the sulfated graphene into hydroxyl graphene, and then the excess sodium hydroxide was removed by electrodialysis to obtain a hydroxyl graphene paste solution having a pH of 8.0 to 9.5.

The defoaming agent is the TANAFOAM S silicone defoaming agent produced by Tuna, Netherlands and having a mass fraction of 46% to 49%.

The levelling agent is the LA13-863 silicone levelling agent produced by Stahl, Netherlands and having a mass fraction of 25%.

The respective materials were mixed together according to the above-mentioned requirement on components and content of the sealant, and stirred uniformly to obtain a hydroxyl graphene-modified plating sealant as described in this example.

The specific process for preparing a plating piece and sealing the plating piece with the hydroxyl graphene-modified plating sealant of this example were as follows:

(1) diluting the plating sealant 3 times with deionized water in a sealing bath to formulate a sealing solution;

(2) barrel-plating a M8.0×30 screw having a material of steel A3 in a cyanide-free alkaline zinc plating bath, wherein the zinc plating has a thickness of 10 to 12 μm;

(3) passivating the plating piece with trivalent chrome blue-white passivation solution, washing with water and immersing in the sealing solution for 20 s, and drip-drying after taking out from the sealing bath;

(4) blowing away the excess sealing solution on the surface of the plating piece by pressure-air, then baking at 80° C. for 40 min, and leaving for 24 h for aging.

A neutral salt spray test was carried out according to ISO 9227: 2017 "Corrosion Tests in Artificial Atmospheres—Salt Spray Tests", white corrosion occurred on the surface of the plating after 312 h and red corrosion occurred on the surface of the plating after 648 h.

Example 2: Hydroxyl Graphene-Modified Plating Sealant

Hydroxyl graphene-modified plating sealant of this example comprises the following components:
film-forming material: 50 parts;
resist: 10 parts;
defoaming agent: 0.5 parts;
levelling agent: 1 parts;
deionized water: 40 parts.

The film-forming material comprises a silica sol and a water-soluble silane polymer, the silica sol having a mass fraction of 60% in the film-forming material and the water-soluble silane polymer having a mass fraction of 40% in the film-forming material.

The silica sol is industrial grade, comprises silicon dioxide having a mass fraction of 40%, and has a nanoscale particle size and a pH of 9.0 to 9.5. The water-soluble silane polymer is the water-soluble silane polymer with a product model PU 113 prepared by Dakin Chemical, Taiwan.

The resist is a hydroxyl graphene paste aqueous solution having a pH of 8.0 to 9.5 and comprising hydroxyl graphene having a mass fraction of 3.8% and a nanoscale particle size.

A method of preparing hydroxyl graphene is as follows.

(1) low temperature oxidation: to a 1000 mL beaker was added 115 mL of concentrated sulfuric acid, the concentrated sulfuric acid was cooled to a temperature of 2 to 5° C. under an ice water bath, 5 g of 300-mesh flake graphite powder having a mass fraction of more than 99% was added, followed by 18 g of potassium permanganate slowly under stirring. The reaction was controlled at a temperature in the range of 2 to 10° C., and the mixture reacted under stirring for 120 min;

(2) medium temperature oxidation: the ice water bath was replaced with a warm water bath, the reaction was controlled at a temperature between 30 to 40° C., and the mixture reacted under stirring for 90 min;

(3) high temperature oxidation: the beaker was removed from the water bath after the medium temperature reaction, and the paste in the beaker was heated to 90° C. 100 mL of water was slowly added, the reaction was controlled at a temperature between 90 to 100° C., and the mixture was stirred for 30 min. 15 mL of 30% hydrogen peroxide was slowly added to the beaker, and reaction continued for 30 min;

(4) sulfuric acid and salts in the reaction products were removed by electrodialysis, 20% sodium hydroxide solution was added to a pH of 11 to 12 to convert the sulfated graphene into hydroxyl graphene, and then the excess sodium hydroxide was removed by electrodialysis to obtain a hydroxyl graphene paste solution having a pH of 8.0 to 9.5.

The defoaming agent is the TANAFOAM S silicone defoaming agent produced by Tuna, Netherlands and having a mass fraction of 46% to 49%.

The levelling agent is the LA13-863 silicone levelling agent produced by Stahl, Netherlands and having a mass fraction of 25%.

The respective materials were mixed together according to the above-mentioned requirement on components and content of the sealant, and stirred uniformly to obtain a hydroxyl graphene-modified plating sealant as described in the present disclosure.

The specific process for preparing a plating piece and sealing the plating piece with the hydroxyl graphene-modified plating sealant of this example were as follows:

(1) diluting the plating sealant 3 times with deionized water in a sealing bath to formulate a sealing solution;

(2) barrel-plating a M8.0×30 screw having a material of steel A3 in a cyanide-free alkaline zinc plating bath, wherein the zinc plating has a thickness of 10 to 12 μm;

(3) passivating the plating piece with trivalent chrome blue-white passivation solution, washing with water and immersing in the sealing solution for 20 s, and drip-drying after taking out from the sealing bath;

(4) blowing away the excess sealing solution on the surface of the plating piece by pressure-air, then baking at 80° C. for 40 min, and leaving for 24 h for aging.

A neutral salt spray test was carried out according to ISO 9227: 2017 "Corrosion Tests in Artificial Atmospheres—Salt Spray Tests", white corrosion occurred on the surface of the plating after 320 h and red corrosion occurred on the surface of the plating after 672 h.

Comparing Examples 1 and 2, it can be seen that when the content of hydroxyl graphene in the plating sealant is increased from 4 parts to 10 parts, in the neutral salt spray test, the time when the white corrosion occurred on the plating increases by 8 h, and the time when the red corrosion occurred on the plating layer increases by 24 h.

Example 3: Hydroxyl Graphene-Modified Plating Sealant

Hydroxyl graphene-modified plating sealant of this example comprises the following components:
film-forming material: 50 parts;
resist: 4 parts;
defoaming agent: 0.5 parts;
levelling agent: 1 parts;
deionized water: 40 parts.

The film-forming material comprises a silica sol and a water-soluble polyurethane, the silica sol having a mass fraction of 60% in the film-forming material and the water-soluble polyurethane having a mass fraction of 40% in the film-forming material.

The silica sol is industrial grade, comprises silicon dioxide having a mass fraction of 40%, and has a nanoscale particle size and a pH of 9.0 to 9.5.

The resist is a hydroxyl graphene paste aqueous solution having a pH of 8.0 to 9.5 and comprising hydroxyl graphene having a mass fraction of 3.8% and a nanoscale particle size.

A method of preparing hydroxyl graphene is as Example 1.

The defoaming agent is the TANAFOAM S silicone defoaming agent produced by Tuna, Netherlands and having a mass fraction of 46% to 49%.

The levelling agent is the LA13-863 silicone levelling agent produced by Stahl, Netherlands and having a mass fraction of 25%.

The respective materials were mixed together according to the above-mentioned requirement on components and content of the sealant, and stirred uniformly to obtain a hydroxyl graphene-modified plating sealant as described in this example.

The specific process for preparing a plating piece and sealing the plating piece with the hydroxyl graphene-modified plating sealant of this example were as follows:

(1) diluting the plating sealant 3 times with deionized water in a sealing bath to formulate a sealing solution;

(2) barrel-plating a M8.0×30 screw having a material of steel A3 in a cyanide-free alkaline zinc plating bath, wherein the zinc plating has a thickness of 10 to 12 μm;

(3) passivating the plating piece with trivalent chrome blue-white passivation solution, washing with water and immersing in the sealing solution for 20 s, and drip-drying after taking out from the sealing bath;

(4) blowing away the excess sealing solution on the surface of the plating piece by pressure-air, then baking at 80° C. for 40 min, and leaving for 24 h for aging.

A neutral salt spray test was carried out according to ISO 9227: 2017 "Corrosion Tests in Artificial Atmospheres—Salt Spray Tests", white corrosion occurred on the surface of the plating after 288 h.

Example 4: Hydroxyl Graphene-Modified Plating Sealant

Hydroxyl graphene-modified plating sealant of this example comprises the following components:
film-forming material: 50 parts;
resist: 4 parts;
defoaming agent: 0.5 parts;
levelling agent: 1 parts;
deionized water: 40 parts.

The film-forming material comprises a silica sol and an acrylic resin, the silica sol having a mass fraction of 60% in the film-forming material and the acrylic resin having a mass fraction of 40% in the film-forming material.

The silica sol is industrial grade, comprises silicon dioxide having a mass fraction of 40%, and has a nanoscale particle size and a pH of 9.0 to 9.5.

The resist is a hydroxyl graphene paste aqueous solution having a pH of 8.0 to 9.5 and comprising hydroxyl graphene having a mass fraction of 3.8% and a nanoscale particle size.

A method of preparing hydroxyl graphene is as Example 1.

The defoaming agent is the TANAFOAM S silicone defoaming agent produced by Tuna, Netherlands and having a mass fraction of 46% to 49%.

The levelling agent is the LA13-863 silicone levelling agent produced by Stahl, Netherlands and having a mass fraction of 25%.

The respective materials were mixed together according to the above-mentioned requirement on components and content of the sealant, and stirred uniformly to obtain a hydroxyl graphene-modified plating sealant as described in this example.

The specific process for preparing a plating piece and sealing the plating piece with the hydroxyl graphene-modified plating sealant of this example were as follows:

(1) diluting the plating sealant 3 times with deionized water in a sealing bath to formulate a sealing solution;

(2) barrel-plating a M8.0×30 screw having a material of steel A3 in a cyanide-free alkaline zinc plating bath, wherein the zinc plating has a thickness of 10 to 12 μm;

(3) passivating the plating piece with trivalent chrome blue-white passivation solution, washing with water and immersing in the sealing solution for 20 s, and drip-drying after taking out from the sealing bath;

(4) blowing away the excess sealing solution on the surface of the plating piece by pressure-air, then baking at 80° C. for 40 min, and leaving for 24 h for aging.

A neutral salt spray test was carried out according to ISO 9227: 2017 "Corrosion Tests in Artificial Atmospheres—Salt Spray Tests", white corrosion occurred on the surface of the plating after 276 h.

Comparative Example 1: Conventional Plating Sealant without Hydroxyl Graphene

The conventional plating sealant having no hydroxyl graphene described in this comparative example was prepared with the following raw materials:
film-forming material: 50 parts;
defoaming agent: 0.5 parts;
levelling agent: 1 parts;
deionized water: 40 parts.

The raw materials used in the sealing agent of this comparative example were the same as that in Example 1 except the hydroxyl graphene, and the preparation method was also the same as that in Example 1.

The processes of preparing and sealing the plating piece were the same as those in Example 1.

After the neutral salt spray test was carried out for 72 h according to the ISO 9227: 2017 "Corrosion Tests in Artificial Atmospheres—Salt Spray Tests", white corrosion occurred on the surface of the plating.

The results of Examples 1 and 2 showed that after 312 to 320 h in the neutral salt spray test, white corrosion occurred on the plating piece sealed with the hydroxyl graphene-modified plating sealant, but in Comparative Example 1, only for 72 h after the neutral salt spray test the white corrosion occurred on the surface of the plating. It can be seen that by using hydroxyl graphene as a resist, the corrosion resistance of the plating piece can be significantly increased.

Comparative Example 2: Sealing Agent with the Addition of Graphene (GNP)

The sealing agent with the addition of graphene for this comparative example was prepared with the following raw materials:
film-forming material: 50 parts;
resist: 10 parts;
defoaming agent: 0.5 parts;
levelling agent: 1 parts;
deionized water: 40 parts.

Graphene was used as the resist: a graphene paste aqueous solution having a pH of 6.5 to 7.0 and comprising graphene having a mass fraction of 3.8% and a nanoscale particle size was formulated using sodium dodecyl sulfonate as an emulsifier.

The other components were the same as that in Example 1, the preparation method was the same as that in Example 1, the processes of preparing and sealing the plating piece were the same as those in Example 1.

After the neutral salt spray test was carried out for 224 h according to the ISO 9227: 2017 "Corrosion Tests in Artificial Atmospheres—Salt Spray Tests", white corrosion occurred on the surface of the plating.

The results of Example 2 show that white corrosion occurred on the plating piece sealed with the hydroxyl graphene sealant in the neutral salt spray test after 320 h, while white corrosion occurred after 224 h in Comparative Example 2. It can be seen that by using hydroxyl graphene as a resist, the corrosion resistance of the plating piece can be significantly increased.

After the sealing solution of Comparative Example 2 was left for 1 week, graphene was completely sunk into the bottom of the sealing solution, indicating that the sealing solution of Comparative Example 2 was unstable and could not be used for industrial production.

Each of the technical features of the above-described embodiments may be combined arbitrarily. To simplify the description, not all of the possible combinations of each of the technical features in the above embodiments are described. However, all of the combinations of these technical features should be considered as within the scope of the present specification, as long as such technical features do not contradict with each other.

The above-described examples merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the protection scope of the present disclosure shall be subject to the appended claims.

What is claimed is:

1. A hydroxyl graphene-modified plating sealant comprising components having the following parts by weight:

| | |
|---|---|
| film-forming material | 40 to 60 parts; |
| anti-corrosive agent | 4 to 12 parts; |
| deionized water | 30 to 50 parts; | wherein the resist is a nanoscale hydroxyl graphene aqueous solution comprising hydroxyl graphene having a mass fraction of 3.5% to 4.0%, and having a pH of 8.0 to 9.5; wherein a method of preparing hydroxyl graphene comprises: adding concentrated sulfuric acid and graphite into a reactor, preparing a graphene oxide by three-step oxidation at a low temperature, a medium temperature, and a high temperature using potassium permanganate as an oxidant in concentrated sulfuric acid, reducing excess potassium permanganate with hydrogen peroxide, removing sulfuric acid and salts in reaction products by electrodialysis, then adding 20% sodium hydroxide solution to pH of 11 to 12 to convert sulfated graphene into hydroxyl graphene, and removing excess sodium hydroxide by electrodialysis so as to obtain a hydroxyl graphene paste solution having a pH of 8.0 to 9.5; and the film-forming material is a mixture comprising a silica sol and one of organic film-forming materials such as a water-soluble silane polymer, a water-soluble polyurethane, and an acrylic resin.

2. The hydroxyl graphene-modified plating sealant according to claim 1, wherein the resist is a nanoscale hydroxyl graphene aqueous solution comprising hydroxyl graphene having a mass fraction of 3.8%.

3. The hydroxyl graphene-modified plating sealant according to claim 1, wherein the silica sol has a mass fraction ranging from 30% to 70% in the film-forming material.

4. The hydroxyl graphene-modified plating sealant according to claim 3, wherein the silica sol has a mass fraction ranging from 50% to 65% in the film-forming material.

5. The hydroxyl graphene-modified plating sealant according to claim 4, wherein the silica sol has a mass fraction of 60% in the film-forming material.

6. The hydroxyl graphene-modified plating sealant according to claim 3, wherein the silica sol has a nanoscale particle size and a pH of 9.0 to 9.5, and comprises silicon dioxide having a mass fraction of 40%.

7. The hydroxyl graphene-modified plating sealant according to claim 1, wherein the organic film-forming material is water-soluble silane polymer.

8. The hydroxyl graphene-modified plating sealant according to claim 7, wherein the water-soluble silane polymer has a product model PU 113.

9. The hydroxyl graphene-modified plating sealant according to claim 1 further comprising components having the following parts by weight:

| | |
|---|---|
| defoaming agent | 0.4 to 0.6 parts; |
| levelling agent | 0.8 to 1.5 parts. |

10. The hydroxyl graphene-modified plating sealant according to claim 9, wherein the defoaming agent is TANAFOAM S silicone defoaming agent having a mass fraction ranging from 46% to 49%.

11. The hydroxyl graphene-modified plating sealant according to claim 9, wherein the levelling agent is LA13-863 silicone leveling agent having a mass fraction of 25%.

12. A method of preparing a hydroxyl graphene-modified plating sealant according to claim 1, wherein the hydroxyl graphene-modified plating sealant is prepared by mixing respective raw materials together according to requirements on components and content of the sealant and uniformly stirring.

* * * * *